United States Patent
Sekiyama

(10) Patent No.: US 11,665,503 B2
(45) Date of Patent: May 30, 2023

(54) COMMUNICATION DEVICE AND METHOD FOR CONTROLLING SAME

(71) Applicant: Icom Incorporated, Osaka (JP)

(72) Inventor: Yoshio Sekiyama, Osaka (JP)

(73) Assignee: Icom Incorporated, Osaka (JP)

( * ) Notice: Subject to any disclaimer, the term of this patent is extended or adjusted under 35 U.S.C. 154(b) by 37 days.

(21) Appl. No.: 17/522,243

(22) Filed: Nov. 9, 2021

(65) Prior Publication Data

US 2022/0159410 A1    May 19, 2022

(30) Foreign Application Priority Data

Nov. 17, 2020   (JP) .............................. JP2020-191114

(51) Int. Cl.
*H04W 4/021*   (2018.01)
*H04W 4/029*   (2018.01)

(52) U.S. Cl.
CPC ........... *H04W 4/022* (2013.01); *H04W 4/029* (2018.02)

(58) Field of Classification Search
CPC .............................. H04W 4/022; H04W 4/029
USPC ...................................................... 455/456.1
See application file for complete search history.

(56) References Cited

U.S. PATENT DOCUMENTS

2011/0051555 A1*   3/2011   Mitchell ................. H03G 3/00
                                                                342/450

FOREIGN PATENT DOCUMENTS

EP    1870871 A1    12/2007
JP    4203038 B2    12/2008

* cited by examiner

*Primary Examiner* — Ted M Wang
(74) *Attorney, Agent, or Firm* — McCarter & English, LLP

(57) ABSTRACT

A communication device includes: a display section; an AIS receiving section configured to receive automatic identification system (AIS) information; a list creating section configured to create, based on the AIS information about vessels existing in the vicinity of the communication device, a proximity order list in which pieces of specific information for identifying the vessels are arranged in increasing order of proximity to the communication device; and a display control section configured to, when the submersion of the communication device has been detected, control the display section so that the display section displays the proximity order list and so that any one of the pieces of specific information at the top of the proximity order list is in a selected state.

6 Claims, 3 Drawing Sheets

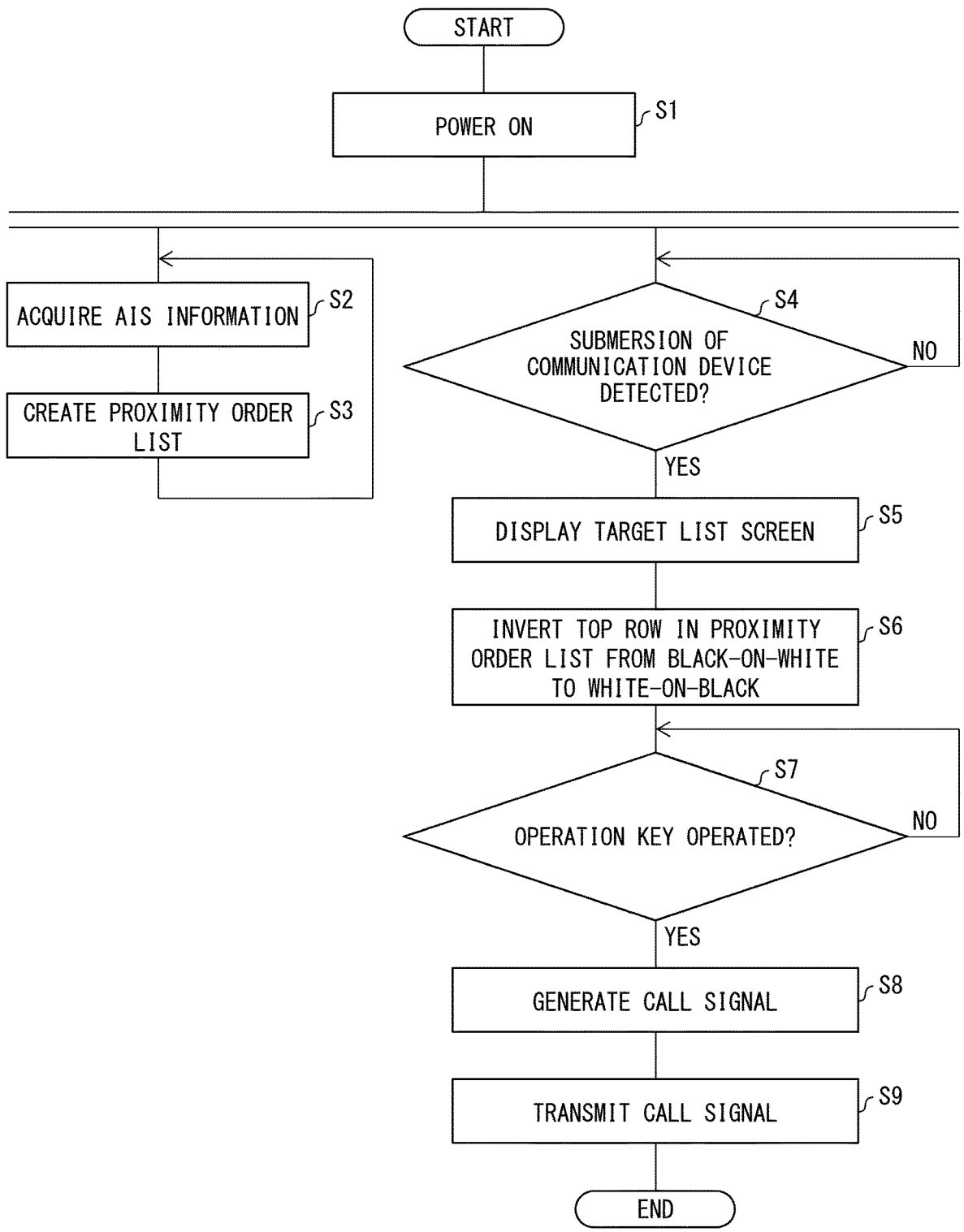

COMMUNICATION DEVICE AND METHOD FOR CONTROLLING SAME

This Nonprovisional application claims priority under 35 U.S.C. § 119 on Patent Application No. 2020-191114 filed in Japan on Nov. 17, 2020, the entire contents of which are hereby incorporated by reference.

TECHNICAL FIELD

The present invention relates to a communication device, particularly to a communication device for vessel communication, and a method for controlling the communication device.

BACKGROUND ART

In vessel radio communication, a communication device having digital selective calling (DSC) functions is used to transmit information for making a notification of an emergency situation to other vessels which navigate around an own vessel. Further, in order to transmit the above information to other vessels, a communication device having an automatic identification system (AIS) function acquires information about the other vessels.

For example, Patent Literature 1 discloses a device in which, based on the information about other vessels acquired by the AIS function, information elements of the other vessels are arranged in descending order of the possibility of approach to the other vessels, and the information elements and their corresponding call keys for calling the other vessels are displayed in association with each other. By operating any of the call keys based on this association, one of the other vessels for the information element corresponding to the operated call key is called.

CITATION LIST

Patent Literature

[Patent Literature 1]
Japanese Patent No. 4203038

SUMMARY OF INVENTION

Technical Problem

When a crew of the own vessel has fallen into water, a distress signal can be transmitted through an operation of a distress key, which is provided as one of DSC functions, to notify a nearby vessel station and a coast station of falling into water. However, since the distress signal is transmitted without designating specific other vessel, a request for rescue cannot be made to the other vessels unless the distress signal is received by any of the other vessels which exist near the own vessel.

Further, Patent Literature 1 does not disclose displaying the information elements and their corresponding call keys for calling the other vessels in association with each other when the crew has fallen into water. Thus, it is not possible to easily call another vessel when the crew has fallen into water.

It is an object of an aspect of the present invention to easily call another vessel when a user has fallen into water from a user's own vessel.

Solution to Problem

In order to solve the above problem, a communication device in accordance with an aspect of the present invention includes: a display section configured to display various kinds of information; an AIS receiving section configured to receive AIS information related to an AIS; a list creating section configured to create, based on the AIS information about vessels existing in a vicinity of the communication device, a proximity order list in which pieces of specific information for identifying the vessels are arranged in increasing order of proximity to the communication device; a submersion detecting section configured to detect that the communication device has been submerged; and a display control section configured to, when the submersion of the communication device has been detected, control the display section so that the display section displays the proximity order list.

Further, provided in an aspect of the present invention is a method for controlling a communication device, wherein the communication device includes: a display section configured to display various kinds of information; an AIS receiving section configured to receive automatic identification system (AIS) information related to an AIS; and a submersion detecting section configured to detect that the communication device has been submerged, the method including: the communication device creating, based on the AIS information about vessels existing in a vicinity of the communication device, a proximity order list in which pieces of specific information for identifying the vessels are arranged in increasing order of proximity to the communication device; and the communication device, when the submersion of the communication device has been detected, controlling the display section so that the display section displays the proximity order list.

Advantageous Effects of Invention

According to the communication device and the like in accordance with an aspect of the present invention, it is possible to easily call another vessel when a user has fallen into water from a user's own vessel.

BRIEF DESCRIPTION OF DRAWINGS

FIG. 3 is a flowchart illustrating the procedure by which another vessel is called when the communication device has been submerged.

DESCRIPTION OF EMBODIMENTS

Embodiments

Figure 1:
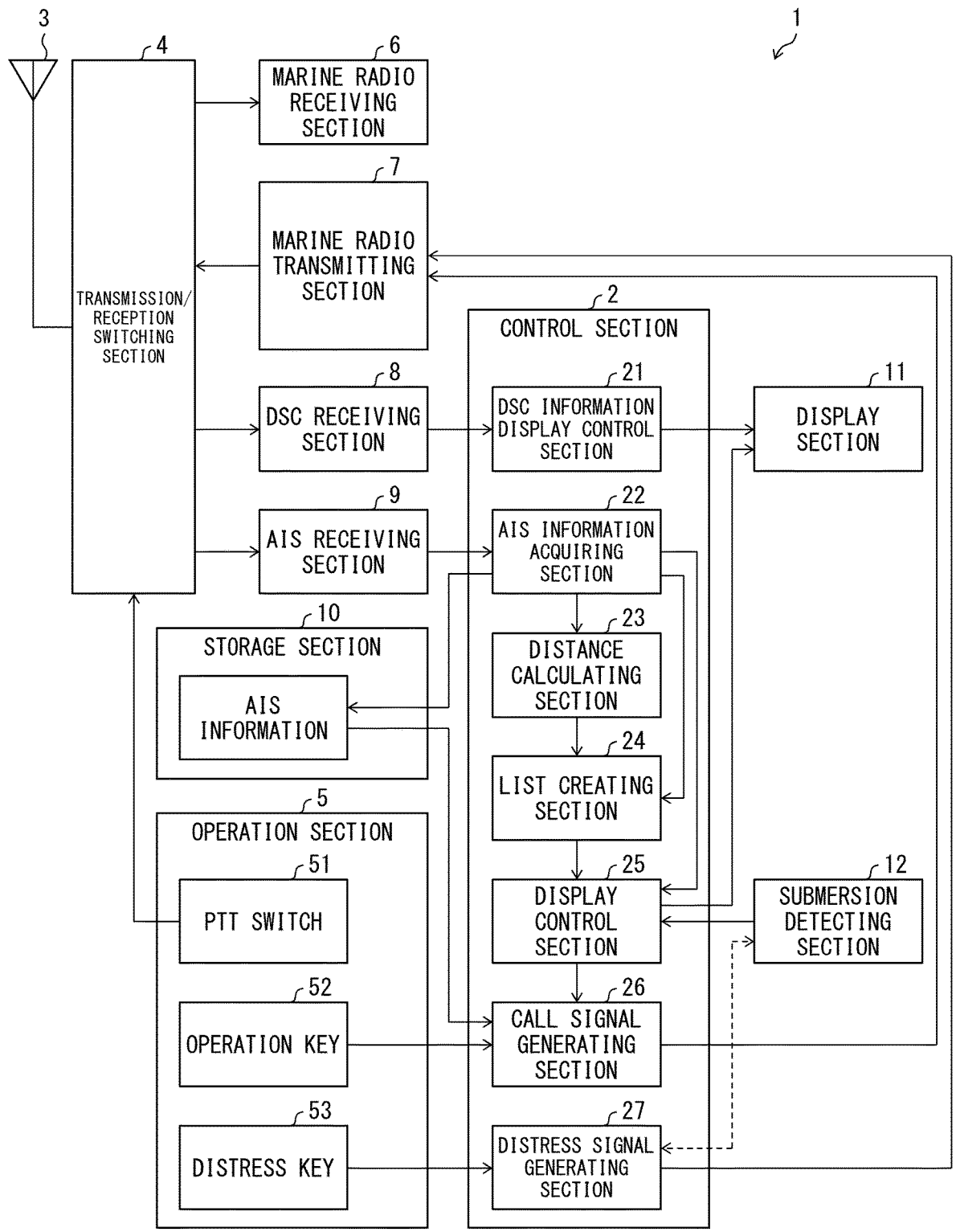
FIG. 1 is a block diagram illustrating a configuration of a main part of a communication device in accordance with an embodiment of the present invention.
Figure 2:
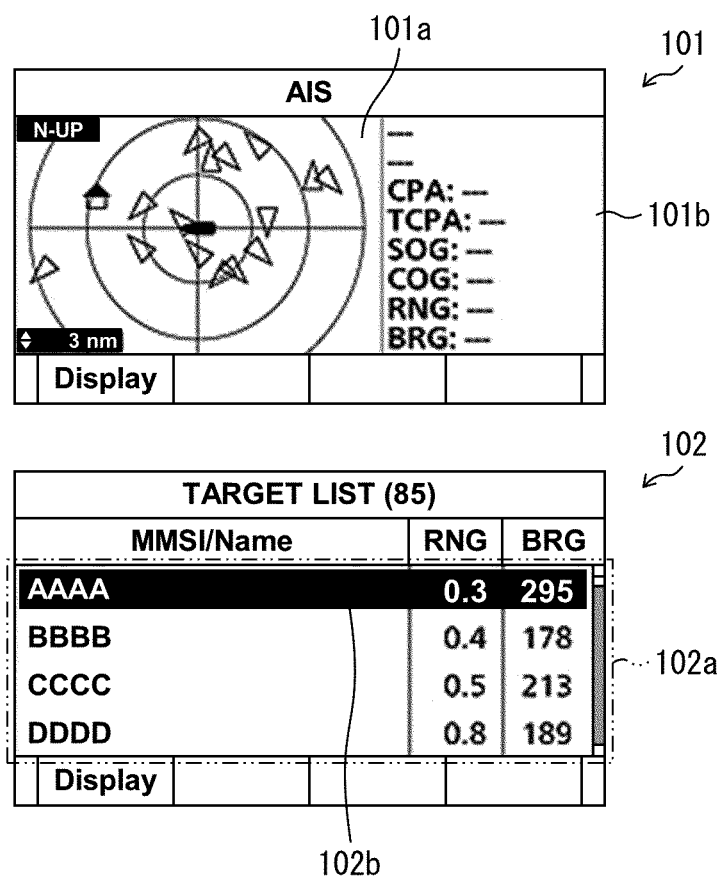
FIG. 2 is a view illustrating an example of a screen for displaying AIS-related information displayed on a display section of the communication device.

The following description will discuss an embodiment of the present invention in detail with reference to FIGS. 1 to 3.

(Configuration of Communication Device 1)

FIG. 1 is a block diagram illustrating a configuration of a main part of a communication device 1 in accordance with an embodiment of the present invention. The communication device 1 is a handheld (portable) device for vessel communication, and is carried by a user who is a crew of an own vessel (vessel).

The communication device 1 has a marine radio communication function of performing communications in a marine radio system such as a very high frequency (VHF) marine radio, and also has an automatic identification system (AIS) function and a digital selective calling (DSC) function. The AIS function is a function of allowing the own vessel and other vessel(s) existing around the own vessel to mutually acquire respective pieces of information on the own vessel and other vessel(s). The DSC function is an automatic call function through digital communication and is added to the marine radio communication function.

Here, marine radio communications refer to radio communications between a radio station on land and a radio station that moves on the sea, such as a vessel station, and radio communications between radio stations that move on the sea, except for AIS communications and DSC communications. Further, in the present embodiment, a marine radio system other than the VHF marine radio may be employed.

As illustrated in FIG. 1, the communication device 1 includes a control section 2, an antenna 3, a transmission/reception switching section 4, an operation section 5, a marine radio receiving section 6 (radio receiving section), and a marine radio transmitting section 7 (radio transmitting section), a DSC receiving section 8, an AIS receiving section 9, a storage section 10, a display section 11, and a submersion detecting section 12. The communication device 1 further include constituent components (not illustrated) which are usually provided in a communication device for vessels, such as a microphone for receiving a voice input, a speaker for outputting a voice, and a global positioning system (GPS) function.

The control section 2 controls the operations of the individual sections of the communication device 1. The control section 2 controls, for example, communications with an external entity by the communication device 1 in accordance with an operation performed by the user on the operation section 5. Further, the control section 2 has a calling function of calling the nearest other vessel (other vessel) to the communication device 1 when the communication device 1 has been submerged. The calling function will be described later.

The transmission/reception switching section 4 outputs, to the antenna 3, for example, a VHF marine radio band transmission signal which is outputted from the marine radio transmitting section 7 when a Push To Talk (PTT) switch 51 (described later) provided in the operation section 5 is operated. Further, the transmission/reception switching section 4 outputs, for example, a VHF marine radio band reception signal which is received by the antenna 3 when the PTT switch 51 is not operated. The reception signal outputted from the transmission/reception switching section 4 is divided into a reception signal processed by the marine radio receiving section 6 and a reception signal processed by the DSC receiving section 8 and by the AIS receiving section 9 by a demultiplexer (not illustrated).

The operation section 5 accepts an operation performed by the user on the communication device 1. The operation section 5 includes a PTT switch 51, an operation key 52, a distress key 53, and others. The PTT switch 51 is a switch that accepts an operation for transmitting a transmission signal from the communication device 1. The operation key 52 is a key that accepts an operation for determining various settings, operations, and the like performed on the screen displayed on the display section 11.

The distress key 53 is a key that accepts an operation for transmitting a distress signal as one DSC function. As the distress key 53 is used an automatic return-type push switch that is turned on only when pressed. For the distress key 53, a switch cover (not illustrated) is provided so that a distress signal is not transmitted due to an erroneous operation of the distress key 53. The distress key 53 or the switch cover is colored red.

The distress signal includes a marine mobile service identity (MMSI) number which is identification information of the communication device 1 (own station), information indicative of a position of the own station, time information, and a distress type. There are eleven distress types: fire/explosion, flooding, collision, grounding, capsizing, sinking, incapability of steering a vessel/adrift, piracy, abandoning of a hull, falling into water (Man-Overboard (MOB)), and undesignated distresses. The distress signal is not transmitted unless the distress key 53 is continuously manipulated for a predetermined manipulation time (for example, 3 seconds).

The marine radio receiving section 6 is a reception circuit that restores a voice signal by demodulating, for example, a radio signal in the VHF marine radio band, and then outputs the restored signal to a speaker (not illustrated). The marine radio transmitting section 7 is a transmission circuit that generates, for example, a radio signal in the VHF marine radio band by modulating a voice signal output from a microphone (not illustrated).

The DSC receiving section 8 is a reception circuit that restores DSC information by demodulating a frequency shift keying (FSK) modulated DSC signal. The DSC receiving section 8 is provided separately from the marine radio receiving section 6. The DSC receiving section 8 receives, as a reception signal, a call signal, a distress signal, and other signals.

The AIS receiving section 9 is a reception circuit that restores AIS information by demodulating a Gaussian filtered MSK (GMSK) modulated AIS signal. The AIS receiving section 9 is provided separately from the marine radio receiving section 6 and the DSC receiving section 8. The AIS information is information on AIS for a vessel to navigate safely, and is information on a vessel that is periodically exchanged between vessels or between a vessel and a base station. The AIS information obtained by the AIS receiving section 9 is information on other vessel, and includes an MMSI number, a vessel name, a position, a course, a speed, a destination, and the like.

Note that the communication device 1 may include an AIS signal generating section that generates an AIS signal related to the own vessel and an AIS transmitting section that transmits the AIS signal, although both of the sections are not illustrated.

The storage section 10 is a storage device which is provided to store information necessary for controlling the communication device 1. Further, the storage section 10 stores AIS information about another vessel. Note that in a case where the communication device 1 includes the above-mentioned AIS transmitting section and AIS signal generating section, the storage section 10 may store AIS information related to the own vessel.

The display section 11 is a display device that displays various kinds of information. The display section 11 displays a communication channel number, information on the position and course of the own station, various icons, a menu screen for selecting items for, for example, settings, a screen for displaying AIS information on AIS, and the like. The display section 11 is a flat display such as a liquid crystal display or an organic electroluminescent (EL) display.

The submersion detecting section 12 includes a pair of electrodes for detecting that the communication device 1 has been submerged, and a detection circuit that outputs a submersion detection signal in the event that the pair of electrodes are short-circuited, although the electrodes and the detection circuit are not illustrated. The pair of electrodes are provided so as to be exposed on the back surface or the like of the housing of the communication device 1. The detection circuit outputs a submersion non-detection signal (for example, a low level) at normal times when the pair of electrodes are not short-circuited, while the detection circuit outputs a submersion detection signal (for example, a high level) in the event that the pair of electrodes are short-circuited when the communication device 1 has been submerged.

Here, the above-mentioned screen for displaying the AIS information displayed on the display section 11 will be described with reference to FIG. 2. FIG. 2 is a view illustrating an example of a screen for displaying the AIS information related to AIS. As illustrated in FIG. 2, examples of the screen for displaying AIS information include a main screen 101 and a target list screen 102. The screen for displaying the AIS information is not limited to these screens.

The main screen 101 includes a plotter section 101a on which the position (azimuth and distance) of other vessel(s) is plotted, and an information display section 101b that displays dynamic information of the own vessel, centering on the communication device 1. Examples of the dynamic information of the own vessel include a speed over ground, a course over ground, a latitude and a longitude, an azimuth, a distance, and a route error. The dynamic information of the own vessel is acquired by the control section 2 at regular intervals by using the above-mentioned GPS function.

The target list screen 102 is a screen including a proximity order list 102a in which pieces of specific information for identifying other vessels are arranged in increasing order of the distance between the other vessels and the communication device 1. The proximity order list 102a is provided with rows including the vessel name or MMSI number, the distance (RNG indicates a range) to the communication device 1, and the azimuth (BNG indicates a bearing) to the communication device 1. In the proximity order list 102a, the vessel name or MMSI number is dealt with as specific information for identifying a target vessel. The proximity order list 102a includes information on all target vessels on which respective pieces of AIS information have been acquired by an AIS information acquiring section 22. In addition, the proximity order list 102a can be scrolled up and down so that specific information about a large number of other vessels can be displayed.

Next, referring back to FIG. 1, the control section 2 will be described in detail.

The control section 2 includes a DSC information display control section 21, an AIS information acquiring section 22, a distance calculating section 23, a list creating section 24, a display control section 25, a call signal generating section 26, and a distress signal generating section 27.

The DSC information display control section 21 causes the display section 11 to display, in a form that the display section 11 can display, the DSC information output from the DSC receiving section 8, for example, call information based on a call signal from another vessel.

The AIS information acquiring section 22 acquires the AIS information output from the AIS receiving section 9. Each time the AIS information acquiring section 22 acquires new AIS information, the AIS information acquiring section 22 updates the AIS information stored in the storage section 10, and gives the acquired AIS information to the distance calculating section 23 and the list creating section 24.

The distance calculating section 23 calculates, based on the AIS information, respective distances between the own vessel which the user who carries the communication device 1 is on board and the other vessels within a communication range of the communication device 1. Specifically, the distance calculating section 23 calculates a distance based on the position and speed of the communication device 1 (own vessel) obtained by the above-mentioned GPS function and the position and speed of any of other vessels acquired from the AIS information.

The list creating section 24 creates the proximity order list 102a, which is included in the target list screen 102, based on the AIS information acquired by the AIS information acquiring section 22. The list creating section 24 uses the distance calculated by the distance calculating section 23 to create the proximity order list.

The display control section 25 generates the screen for displaying the AIS information, and controls the display section 11 so that the display section 11 displays the screen. The display control section 25 generates the main screen 101 based on the position of any of the other vessels acquired from the AIS information and the above-mentioned dynamic information of the own vessel. Further, the display control section 25 generates the target list screen 102 that includes the proximity order list 102a having been created by the list creating section 24. The display control section causes the display section 11 to display the above-mentioned menu screen for selecting a screen to be displayed, and causes the display section 11 to display the main screen 101, the target list screen 102, and the like as screens selected by the user on the menu screen.

The display control section 25 further controls the display section 11 so that the display section 11 displays the target list screen 102, when the submersion detecting section 12 has detected the submersion of the communication device 1. Further, when the submersion of the communication device 1 has been detected, the display control section 25 controls the display section 11 so that the vessel name or MMSI number of a target vessel appearing in a top row 102b included in the displayed target list screen 102 is in a selected state on the display section 11. The top row 102b is a top row of the proximity order list 102a included in the target list screen 102.

Here, the selected state refers to a state in which the communication device 1 is ready for calling the target vessel indicated on the target list screen 102 through an operation key 52 which is to perform an operation for determining selection of the vessel name or MMSI number of the target vessel. As an example of the selected state, the display control section 25 controls the display section 11 so that the display section 11 inverts the top row 102b from black-on-white to white-on-black in a different manner from the displayed state of the other rows, as illustrated in FIG. 2.

Upon receiving a transmission instruction, the call signal generating section 26 generates a call signal for calling another vessel specified by the vessel name or MMSI number which has been selected on the target list screen 102. The transmission instruction is given based on the operation performed on the operation key 52 by the user. The call signal generating section 26 outputs the call signal to the marine radio transmitting section 7. The call signal generating section 26 is provided to realize a call function that is a part of the DSC functions.

The distress signal generating section 27 generates a distress signal in response to a press operation performed on the distress key 53 by the user for a period of time exceeding the above-mentioned predetermined operation time. The distress signal generating section 27 acquires, from the storage section 10 and other section, the MMSI number, which is identification information of the own station, position information of the own station, time information, and the type of distress to generate the distress signal. The distress signal generating section 27 outputs the distress signal to the marine radio transmitting section 7. The distress signal generating section 27 is provided to realize a part of the DSC functions.

Note that, when the communication device 1 has been submerged, the distress signal generating section 27 may select "falling into water" as the type of distress included in the distress signal. Specifically, when the operation time of the distress key 53 exceeds a predetermined operation time in a state in which the submersion detection signal from the submersion detecting section 12 is continuously outputted for a predetermined period of time (for example, 10 ms) or more, the distress signal generating section 27 selects "falling into water" from among the types of distress and incorporates it into the distress signal.

(Processes Performed by the Control Section 2)

Next, the following description will discuss the processes performed by the control section 2 that calls another vessel when the communication device 1 has been submerged. FIG. 3 is a flowchart illustrating the procedure (control method) by which another vessel is called when the communication device 1 has been submerged.

As illustrated in FIG. 3, the user first powers on the communication device 1 (step S1). In this state, the marine radio receiving section 6, the marine radio transmitting section 7, the DSC receiving section 8, and the AIS receiving section 9 are supplied with electric power to operate. The AIS receiving section 9 demodulates the AIS signal received by the antenna 3 and outputs the AIS information.

After the step S1, the processes in steps S2 to S3 and the processes in steps S4 to S9 are performed in parallel.

The AIS information acquiring section 22 acquires the AIS information from the AIS receiving section 9 (step S2). The distance calculating section 23 calculates distances between the own vessel and the other vessels based on the position and speed of the communication device 1, that is, the own vessel, and the positions and speeds of the other vessels in the AIS information having been acquired by the AIS information acquiring section 22.

The list creating section 24 creates the proximity order list 102a by using the AIS information having been acquired by the AIS information acquiring section 22 and the distances calculated by the distance calculating section 23 (step S3). Since the AIS information acquiring section 22 periodically acquires the AIS information, the processes in the steps S2 and S3 are repeated.

Meanwhile, after the step S1, the submersion detecting section 12 monitors whether or not the communication device 1 has been submerged (step S4). In the step S4, if the submersion detecting section 12 does not detect the submersion of the communication device 1 (that is, if the submersion non-detection signal is outputted from the submersion detecting section 12 (NO)), the monitoring performed by the submersion detecting section 12 is continued. Further, in the step S4, if the submersion detecting section 12 detects the submersion of the communication device 1 (that is, if the submersion detection signal is outputted from the submersion detecting section 12 (YES)), the display control section 25 causes the target list screen 102 to be displayed (step S5).

As described above, the list creating section 24 creates the proximity order list 102a based on the AIS information acquired periodically (steps S2 and S3). Thus, the display control section 25 can display the target list screen 102 including the latest proximity order list 102a which is created at the point in time when the communication device 1 is submerged.

Subsequently, the display control section 25 controls the display section 11 so that the top row 102b in the proximity order list 102a included in the target list screen 102 is in a selected state (as an example, so that the top row 102b is black and white inverted from black-on-white to white-on-black), as illustrated in FIG. 2 (step S6).

Note that the top row 102b in the selected state only needs to be displayed in a state different from a displayed state of the other rows. Thus, the display control section 25 may display a cursor on the top row 102b as an example, instead of inverting the top row 102b from black-on-white to white-on-black.

Further, the display control section 25 may display the target list screen 102 on the display section 11 in a manner as described below, instead of the steps S5 and S6. The display control section 25 creates in advance data of the target list screen 102 in which the top row of the proximity order list 102a is inverted from black-on-white to white-on-black, and when the submersion of the communication device 1 is detected, the display control section 25 causes the display section to display the target list screen 102 based on that data.

The call signal generating section 26 determines whether or not the operation key 52 has been operated by the user (step S7). In the step S7, if the call signal generating section 26 does not determine that the operation key 52 has been operated (NO), the call signal generating section 26 continues the determination. Further, in the step S7, if the call signal generating section 26 determines that the operation key 52 has been operated (YES), the call signal generating section 26 generates the call signal (step S8). Then, the marine radio transmitting section 7 modulates the call signal received from the call signal generating section 26 and transmits the modulated signal over a predetermined call channel (step S9).

Thus, when the submersion of the communication device 1 has been detected, the screen of the display section 11 is automatically switched to the target list screen 102 even though some kind of information is displayed on the display section 11, and the target vessel at the top of the proximity order list 102a of the target list screen 102 is in a selected state. As a result, when the user operates the operation key 52 in a state in which the user has fallen out of the own vessel, the call signal is automatically transmitted, over the call channel, to the nearest target vessel to the communication device 1. This makes it possible to call the target vessel with a small number of operations even when the user having fallen into water cannot afford to waste a minute.

When the target vessel receives the call signal and returns a response, the marine radio receiving section 6 receives a response signal from the target vessel. As a result, the target vessel and the user make contact with each other over a conversation channel, and thereafter, the target vessel and the user have conversations with each other over the conversation channel to which the communication channel is switched from the call channel. This allows a person who has fallen into water to request the nearest target vessel for rescue.

Further, when the person who has fallen into water presses and holds down the distress key 53, a distress signal including "falling into water" as the type of distress is transmitted. This makes it possible to make a request for rescue by the distress signal together with a call to the target vessel.

Further, the communication device 1 includes the DSC receiving section 8. This allows the communication device 1 carried by the user to receive the call signal at any place in the own vessel. This eliminates the need to wait at a fixed position so that a call signal from another vessel is received by a communication device installed at the fixed position, and then listen to the call.

[Software Implementation Example]

Control blocks (control section 2) of the communication device 1 can be realized by a logic circuit (hardware) provided in an integrated circuit (IC chip) or the like or can be alternatively realized by software.

In the latter case, the communication device 1 includes a computer that executes instructions of a program that is software realizing the foregoing functions. The computer, for example, includes at least one processor and a computer-readable storage medium storing the program. An object of the present invention can be achieved by the processor of the computer reading and executing the program stored in the storage medium.

Examples of the processor encompass a central processing unit (CPU). Examples of the storage medium encompass a "non-transitory tangible medium" such as a read only memory (ROM), a tape, a disk, a card, a semiconductor memory, and a programmable logic circuit. The computer may further include a random access memory (RAM) or the like in which the program is loaded. Further, the program may be supplied to or made available to the computer via any transmission medium (such as a communication network and a broadcast wave) which allows the program to be transmitted.

Note that an aspect of the present invention can also be achieved in the form of a computer data signal in which the program is embodied via electronic transmission and which is embedded in a carrier wave.

Aspects of the present invention can also be expressed as follows:

A communication device in accordance with a first aspect of the present invention includes: a display section configured to display various kinds of information; an AIS receiving section configured to receive AIS information related to an AIS; a list creating section configured to create, based on the AIS information about vessels existing in a vicinity of the communication device, a proximity order list in which pieces of specific information for identifying the vessels are arranged in increasing order of proximity to the communication device; a submersion detecting section configured to detect that the communication device has been submerged; and a display control section configured to, when the submersion of the communication device has been detected, control the display section so that the display section displays the proximity order list.

According to the above configuration, in the event that a user who carries the communication device has fallen into water from the own vessel, the proximity order list is displayed on the display section when the submersion detecting section detects that the communication device has been submerged. This allows the user to select the specific information at the top of the proximity order list when the user has fallen into water.

In a second aspect of the present invention, the communication device can be configured such that, in the first aspect of the present invention, the display control section controls the display section so that any one of the pieces of specific information at a top of the proximity order list is in a selected state, the communication device further includes: a call signal generating section configured to, in response to a transmission instruction, generate a call signal for calling one vessel identified by the selected piece of specific information among the vessels: and a radio transmitting section configured to transmit the call signal.

According to the above configuration, the specific information at the top of the proximity order list is selected. When the call signal is generated in response to the transmission instruction given by a key operation or the like performed by the user, the call signal is transmitted to the vessel identified by the specific information. As a result, the nearest vessel to the communication device is called. This makes it possible to notify the vessel of falling into water as soon as possible, as compared with distress communication in which a distress signal is transmitted to unspecified vessels. In addition, it is possible to specify a vessel which is so near to the communication device as to be visible and communicate with the specified vessel.

In a third aspect of the present invention, the communication device can be configured such that, in the first or second aspect of the present invention, the communication device further includes: a DSC receiving section configured to receive a DSC signal.

According to the above configuration, the communication device being carried can receive the call signal from another vessel at any place in the own vessel.

In a fourth aspect of the present invention, the communication device can be configured such that, in the second aspect of the present invention, the communication device further includes: a radio receiving section configured to receive a radio signal, the radio receiving section being provided separately from the AIS receiving section and the DSC receiving section configured to receive the DSC signal, wherein the radio receiving section receives a response signal from a communication device of the vessel which has received the call signal.

According to the above configuration, by receiving the response signal from the vessel having received the call signal, communication with the vessel can be started to make a request for rescue.

In a fifth aspect of the present invention, the communication device can be configured such that, in any of the first to fourth aspects of the present invention, the communication device is a portable communication device. According to the above configuration, the user who has fallen into water in a state of carrying the communication device can easily call another vessel.

A method for controlling a communication device in accordance with a sixth aspect of the present invention, wherein the communication device includes: a display section configured to display various kinds of information; a radio transmitting section configured to transmit a radio signal; a radio receiving section configured to receive the radio signal; an AIS receiving section configured to receive automatic identification system (AIS) information related to an AIS; and a submersion detecting section configured to detect that the communication device has been submerged, includes: the communication device creating, based on the AIS information about vessels existing in a vicinity of the communication device, a proximity order list in which pieces of specific information for identifying the vessels are arranged in increasing order of proximity to the communication device; and the communication device, when the submersion of the communication device has been detected, controlling the display section so that the display section displays the proximity order list.

According to the above configuration, the same effect as in the first aspect is produced.

The present invention is not limited to the embodiments, but can be altered by a skilled person in the art within the scope of the claims. The present invention also encompasses, in its technical scope, any specific embodiment derived by combining technical means disclosed in differing embodiments.

REFERENCE SIGNS LIST

1: communication device
6: marine radio receiving section (radio receiving section)
7: marine radio transmitting section (radio transmitting section)
8: DSC receiving section
9: AIS receiving section
11: display section
12: submersion detecting section
24: list creating section
25: display control section
26: call signal generating section
102a: proximity order list

The invention claimed is:

1. A communication device comprising:
a display section configured to display various kinds of information;
an AIS receiving section configured to receive automatic identification system (AIS) information related to an AIS;
a list creating section configured to create, based on the AIS information about vessels existing in a vicinity of the communication device, a proximity order list in which pieces of specific information for identifying the vessels are arranged in increasing order of proximity to the communication device;
a submersion detecting section configured to detect that the communication device has been submerged; and
a display control section configured to, when the submersion of the communication device has been detected, control the display section so that the display section displays the proximity order list.

2. The communication device according to claim 1, wherein
the display control section controls the display section so that any one of the pieces of specific information at a top of the proximity order list is in a selected state, said communication device further comprises:
a call signal generating section configured to, in response to a transmission instruction, generate a call signal for calling one vessel identified by the selected piece of specific information among the vessels: and
a radio transmitting section configured to transmit the call signal.

3. The communication device according to claim 1, further comprising:
a DSC receiving section configured to receive a digital selective calling (DSC) signal.

4. The communication device according to claim 2, further comprising:
a radio receiving section configured to receive a radio signal, the radio receiving section being provided separately from the AIS receiving section and the DSC receiving section configured to receive the DSC signal,
wherein the radio receiving section receives a response signal from a communication device of the vessel which has received the call signal.

5. The communication device according to claim 1, wherein
said communication device is a portable communication device.

6. A method for controlling a communication device, wherein the communication device is a portable communication device that comprises: a display section configured to display various kinds of information; an AIS receiving section configured to receive automatic identification system (AIS) information related to an AIS; and a submersion detecting section configured to detect that the communication device has been submerged, the method comprising:
the communication device creating, based on the AIS information about vessels existing in a vicinity of the communication device, a proximity order list in which pieces of specific information for identifying the vessels are arranged in increasing order of proximity to the communication device; and
the communication device, when the submersion of the communication device has been detected, controlling the display section so that the display section displays the proximity order list.

* * * * *